United States Patent [19]
Pompei

[11] Patent Number: 5,764,684
[45] Date of Patent: Jun. 9, 1998

[54] INFRARED THERMOCOUPLE IMPROVEMENTS

[75] Inventor: Francesco Pompei, Boston, Mass.

[73] Assignee: Exergen Corporation, Watertown, Mass.

[21] Appl. No.: 417,069

[22] Filed: Apr. 4, 1995

[51] Int. Cl.$^6$ ........................................ G01J 5/00
[52] U.S. Cl. ................ 374/126; 374/127; 374/128
[58] Field of Search ............................ 374/126, 127, 374/128

[56] References Cited

U.S. PATENT DOCUMENTS

| | | | |
|---|---|---|---|
| 2,658,390 | 11/1953 | Machler | 73/355 |
| 3,435,237 | 3/1969 | Collins | 374/127 |
| 4,470,710 | 9/1984 | Crane et al. | 374/127 |
| 4,481,417 | 11/1984 | Inglee | 250/338 |
| 4,579,461 | 4/1986 | Rudolph | 374/126 |
| 4,626,686 | 12/1986 | Pompei et al. | 250/342 |
| 4,659,234 | 4/1987 | Brouwer et al. | 374/127 |
| 4,722,612 | 2/1988 | Junkert et al. | 374/124 |
| 4,764,025 | 8/1988 | Jensen | 374/127 |
| 4,765,752 | 8/1988 | Beynon et al. | 374/127 |
| 4,948,958 | 8/1990 | Sweeney | 374/127 |
| 5,061,084 | 10/1991 | Thompson et al. | 374/127 |
| 5,081,359 | 1/1992 | Pompei | 250/349 |
| 5,180,227 | 1/1993 | John et al. | 374/131 |
| 5,229,612 | 7/1993 | Pompei et al. | 250/349 |

OTHER PUBLICATIONS

Raynger User's Manual, Raytek, Inc., Santa Cruz, CA, 1983, pp. 1–17.

Barron, W.R., "Principles of Infrared Thermometry," Sensors Magazine, vol. 9, No. 13, 1992, (reproduced with permission).

Hawley's Condensed Chemical Dictionary, Twelfth Edition, Revised by Richard J. Lewis, Sr., 1993, p. 1022.

Primary Examiner—Daniel G. DePumpo
Attorney, Agent, or Firm—Hamilton, Brook, Smith & Reynolds, P.C.

[57] ABSTRACT

The output stability of an infrared thermocouple is improved by filtering the radiation received by the infrared thermocouple to pass only short wavelengths. The stability is further increased by providing a second infrared thermocouple having its input filtered to pass long wavelengths. The two outputs are combined to obtain an output signal which is substantially independent of emissivity. The linear range of an infrared detector through which its output closely follows that of a linear thermocouple is increased by a calibration method in which an initial offset is provided to a readout device. Calibration of the infrared detector is completed using an adjustable potentiometer. By providing removable apertures, the temperature range through which an infrared thermocouple may be used is extended. Elongated targets are efficiently viewed by an infrared thermocouple having an elongated thermopile flake and an imaging lens.

12 Claims, 11 Drawing Sheets

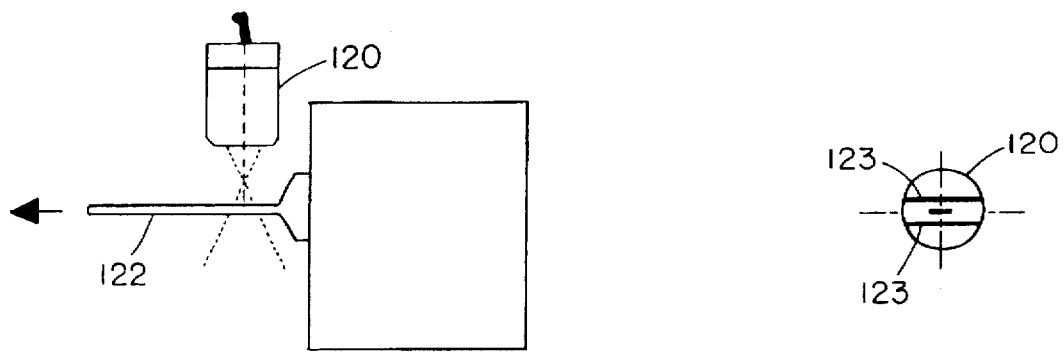
FIG. 13A
FIG. 13B
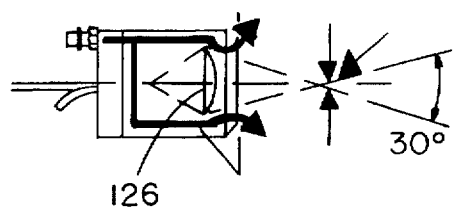
FIG. 13C
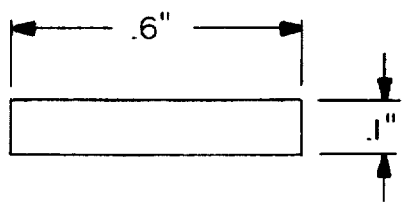
FIG. 13D
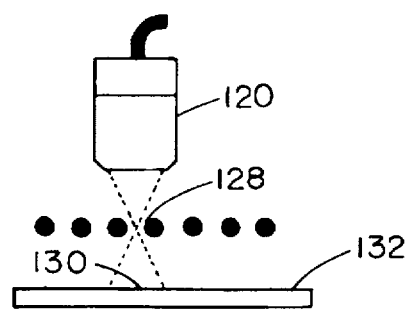
FIG. 14

INFRARED THERMOCOUPLE IMPROVEMENTS

BACKGROUND

A widely used temperature detector in industrial and many other applications is the thermocouple. A thermocouple comprises two wires of dissimilar metals joined at hot and cold junctions. A voltage is created as a function of temperature difference between the junctions. In a typical application, the thermocouple has a first junction of dissimilar electrical conductors in thermal contact with a material, the temperature of which is to be detected. The dissimilar conductors pass through a lead to a temperature controller where they connect electrically at a second thermocouple junction. The temperature of the second junction is maintained at a stable reference level or is monitored. The voltage generated due to the difference in temperature at the two junctions then serves as an indication of the temperature difference between the temperature being detected and the reference temperature.

A disadvantage of thermocouples is that they require contact to the material being sensed. Radiation detectors such as thermopiles and pyroelectric devices have been used as a noncontact alternative to thermocouples. Radiation detectors are based on the principle that the thermal radiation emitted from a subject is proportional to the temperature of the subject raised to the fourth power. The radiation emitted is also a function of the emissivity of the subject and of background radiation, but those factors can be calibrated out for applications in which the target has consistent properties.

A preferred type of radiation sensor is the thermopile. A thermopile has hot and cold junctions, the hot junction being exposed to thermal radiation from a target. The radiation received from the target raises the temperature of the hot junction and the temperature difference between the hot and cold junctions of the thermopile causes a voltage to be produced. Thermopiles respond directly to heat flux rather than to temperature, so temperature detection has required close monitoring of the temperature of the thermopile cold junction and appropriate processing electronics. Whereas thermocouple technology relies on inexpensive thermocouple junctions which may be plugged into widely used thermocouple controllers, radiation detectors have typically required full electronics associated with each thermopile detector.

The infrared thermocouple presented in U.S. Pat. Nos. 5,229,612 and 5,319,202 obtains the advantages of noncontact temperature sensing of the radiation detector using a detector element having electronic simplicity approaching that of thermocouples. Infrared thermocouples may be coupled directly into thermocouple controllers which are prevalent in the industrial environment.

In its simplest form, the infrared thermocouple comprises a thermopile, for viewing a target, coupled in series with thermocouple junctions. One thermocouple junction is located by the thermopile while the other junction may be in the thermocouple controller to provide the reference. With such a connection, the thermocouple controller sees the combined voltage generated by the thermocouple junctions and the thermopile as it would see the voltage generated by thermocouple junctions alone. The remote thermocouple junction eliminates the need for the usual absolute temperature sensor at the thermopile cold junction. By proper design of the thermopile and thermocouple, the combination can be caused to mimic the output of a conventional thermocouple over a temperature range of interest.

Since the thermocouple is a linear device and the thermopile is a nonlinear device which has a voltage output proportional to the fourth power of the target temperature, the infrared thermocouple can only be caused to mimic the thermocouple over a limited temperature range. To enable calibration of the infrared thermocouple to a desired target temperature, it is preferred that a potentiometer be connected across the thermopile output to calibrate that output. A typical infrared thermocouple provides an output of plus or minus 2 percent of the linear thermocouple value over a range of about 100° F. (60° C.). With a calibrating potentiometer, the target temperature about which that 100° F. range of linearity occurs can be set within a much wider range of temperatures.

SUMMARY OF THE INVENTION

The present invention relates to several methods for extending the applications of the infrared thermocouple. For example, one limitation on prior infrared thermocouples has been the sensitivity to changes in emissivity of the target, particularly for targets of low emissivity. Further, there is a preference to extend the linear range over which an infrared thermocouple output approximates the linear output of a thermocouple.

In accordance with one aspect of the invention, an infrared detector coupled to a readout device is adapted to be less sensitive to changes in emissivity with low emissivity targets. The infrared detector is preferably an infrared thermocouple or other device having a sensor which generates voltage in response to infrared radiation in a passive circuit. Radiation to the infrared thermocouple is filtered to block substantially all radiation of wavelengths greater than 5 microns. A particularly beneficial filter is a sapphire filter which has a pass band of about 0.1 to 5 microns. By limiting the detected radiation to shorter wavelengths, the sensitivity of the thermopile signal to temperature changes is increased without increasing the sensitivity of the signal to emissivity changes.

A disadvantage of the detection of only shorter wavelengths and the resultant increased sensitivity to temperature is that the thermopile response is even more nonlinear than with typical infrared thermocouples. Accordingly, the linear temperature range is substantially reduced. In order to increase the linear range of low exissivity infrared thermocouples as well as more conventional infrared thermocouples and other infrared detectors, a new calibration method is provided. Accordingly, an offset to the readout device, such as a thermocouple controller, is provided to cause an offset readout even when no radiation input is provided to the infrared detector. The infrared detector is then calibrated, using an available calibration potentiometer or variable aperture or combination of the two, as the detector views a target at a known calibration temperature. With calibration of the infrared detector, the readout is caused to correspond to the readout which would be expected at the calibration temperature.

By this calibration technique, the voltage signal seen at the readout device is first raised by the offset through the full temperature range and then lowered by means of the potentiometer calibration through only the higher temperature ranges. The resultant effect is a rotation of the nonlinear voltage response seen at the readout device. That rotation causes the voltage seen by the readout device to more closely follow the linear output of a thermocouple over a substantially larger temperature range. In fact, the temperature range of a low emissivity model infrared thermocouple may be increased from about 50° F. (10° C.) to about 300° F. (150° C.).

Prior high emissivity detectors have included 6.5 to 14 micron pass filters for low temperature applications of less than 1000° F. (540° C.) and 2 to 20 micron pass filters for applications ranging from room temperature to 5000° F. (2750° C.). The high bandwidth and high temperature response of the 2 to 20 micron detector is at the cost of reduced linearity. The linear temperature range of about 100° F. (60° C.) found with the 6.5 to 14 micron infrared thermocouples and other radiation detectors can be extended to more than 500° F. (280° C.). The linear temperature range of the 2 to 20 micron detector can be extended from 50° F. (10° C.) to about 300° F. (150°).

The optimum offset to be added at the readout device is roughly a percentage of the target temperature. For low emissivity models with a 0.1 to 5 micron filter, an offset of about 75% of target temperature readout is preferred. For the high emissivity models with 2–20 micron spectral range, the optimum offset is about 60%. For very high target temperatures, an offset of only about 50% is preferred. In general, an offset of from about 40% to 100% of target temperature results in significant improvement in linearity.

The sensitivity to changes in emissivity can be further reduced by using two infrared thermocouple detectors, each having a different filter. A short wavelength pass filter, such as the sapphire filter, is used for filtering radiation to one infrared thermocouple and a long wavelength filter, such as one which passes wavelengths of 6.5 microns to 14 microns filters radiation to the second infrared thermocouple. The radiation sensed from the target through the two filters and infrared thermocouples provides first and second emissivity dependent outputs. However, those outputs can be combined to provide a temperature indication which is substantially less dependent on emissivity. Since the lower wavelength output is much more dependent on temperature changes and both outputs are similarly dependent on emissivity changes, the two outputs together permit the determination of an emissivity independent temperature readout. At very high temperatures, the longer wavelength output becomes nearly independent of change in temperature. In that case, the two infrared thermocouple outputs can be differentially coupled to provide a direct reading of emissivity independent temperature. A calibration method for that differentially coupled infrared thermocouple includes first calibrating the short wavelength infrared thermocouple using the offset and potentiometer adjustment. Then, the two infrared thermocouples are connected differentially and the potentiometer of the long wavelength infrared thermocouple is adjusted to bring the readout to the initial offset value. Finally, the offset is changed to bring the output to the known calibration temperature.

The range of temperatures over which an infrared thermocouple may be calibrated is generally limited by the amount of radiation to which the thermopile may be exposed. Viewing a target of extremely high temperature may overload the thermopile. Infrared thermocouples adapted to view extremely high temperatures must have smaller apertures to limit the amount of radiation which passes to the thermopile. However, such infrared thermocouples are then unsuitable for lower temperature applications. In accordance with another aspect of the present invention, an infrared thermocouple may be easily and inexpensively adapted to a very wide range of target temperatures by removably coupling an aperture to the infrared thermocouple to limit radiation sensed by the thermopile. In one simple implementation, a groove is provided within an open window through which the thermopile views the target. The aperture may be retained within the window by a clip seated in the groove. A kit of different aperture sizes may be provided and an appropriate aperture may be selected, with smaller apertures being used for higher temperature applications.

The fields of view of infrared thermocouples must be designed to meet various applications. For large target areas, a wide field of view may be used to increase the amount of radiation received by the thermopile and thus the sensitivity of the infrared thermocouple. On the other hand, with small target areas, a small field of view has been used in order to avoid the detection of background surface temperatures. In accordance with yet another aspect of this invention, an infrared thermocouple is adapted to provide maximum sensitivity without sensing background temperatures for extended targets such as rods or filaments. Accordingly, the infrared thermocouple has a thermopile sensor region which is elongated along a sensor axis and which is positioned to parallel the target axis. A lens is provided to image the target on to the sensor region. Although the sensor region may be defined by an aperture which is also imaged onto the thermopile, it is preferred that the thermopile flake itself have an elongated shape.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 13A is an illustration of an application of an elongated flake embodiment of the invention.

FIG. 13B illustrates alignment lines on the rear surface of the infrared thermocouple of FIG. 13A.

FIG. 13C is a cross-sectional view of the infrared thermocouple of FIG. 13A with focusing lens.

FIG. 13D illustrates an image of thermopile flake having an elongated shape in the embodiment of FIG. 13A.

FIG. 14 illustrates yet another application of the embodiment of FIGS. 13A–D.

DETAILED DESCRIPTION OF THE PREFERRED EMBODIMENTS

Figure 1:
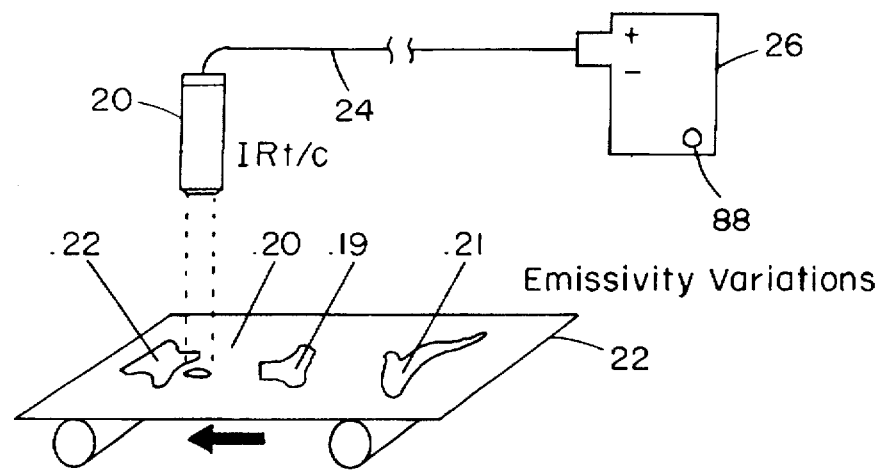
FIG. 1 illustrates an infrared thermocouple with thermocouple controller embodying the present invention.

FIG. 1 illustrates a typical application of an infrared thermocouple. An infrared thermocouple 20 is positioned to view a target surface 22 which, in this case, is a sheet of material which moves from right to left. The dissimilar thermocouple wires extend through a lead 24 to a remote readout device 26. The readout device 26 may be any conventional device adapted to receive thermocouple leads and provide a display or transmit an output such as thermocouple controllers, PLCs, meters and transmitters.

Figure 2:
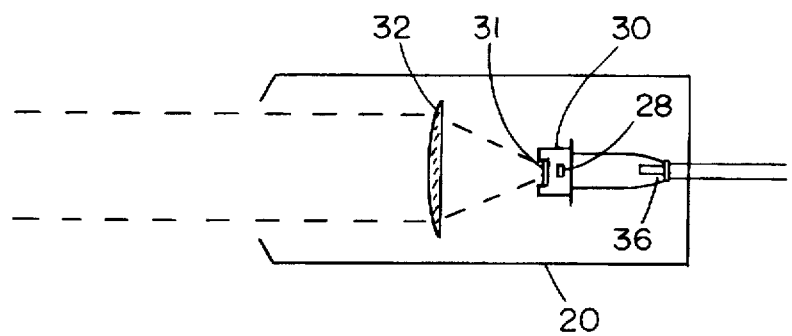
FIG. 2 is a cross-sectional view of the infrared thermocouple detector.

A cross-sectional schematic of the detector 20 is shown in FIG. 2. A thermopile flake 28 is positioned within a sealed can 30 having a rigid infrared transparent window 31. The conventional thermopile can surrounds the thermopile flake in a xenon environment. In order to narrow the field of view of the infrared thermocouple detector, a lens 32 may be provided. Preferably, the lens is a Fresnel lens.

Figure 3:
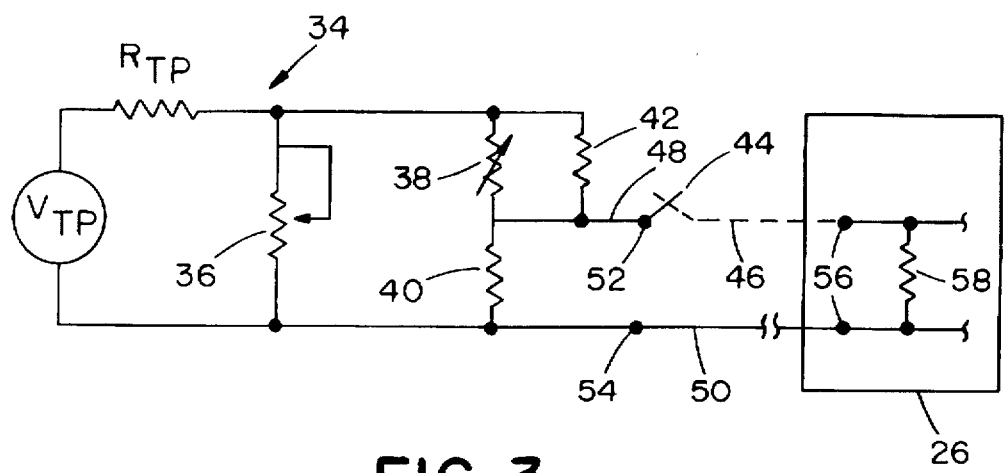
FIG. 3 is an electrical schematic of the system of FIGS. 1 and 2.

FIG. 3 illustrates a preferred circuit of the infrared thermocouple detector. A thermopile 34 includes the thermopile flake 28 and produces a voltage output in response to the temperature differential created between the hot and cold junctions of the thermopile 34. In this circuit, the thermopile 34 is shown as its electrical equivalents of a voltage source $V_{TP}$ and in internal resistance $R_{TP}$. A user adjustable potentiometer 36 is coupled directly across the thermopile 34 to allow for calibration of the thermopile output using an external adjustment screw 38 (FIG. 2). A temperature dependent resistor 38, in cooperation with parallel resistor 42 and series resistor 40, make the output taken across resistor 40 generally independent of cold junction temperature.

The thermopile circuit is connected in series with the thermocouple junction 44 between dissimilar conductors 46 and 48. Those conductors may be of any known thermocouple material. Conductor 50 is of the same material as conductor 48. Since the connections 52 and 54 are maintained at a common temperature, the thermopile circuit does not effect the thermocouple function, but only adds the voltage output of the thermopile circuit to that of the thermocouple. The reference junction of the thermocouple is formed at 56 in the readout device 26. The voltage across the resistor 58 is then the sum of the thermopile output voltage across resistor 40 and the thermocouple voltage resulting from the temperature difference between remote junction 44 and reference junction 56. In conventional thermocouple readout devices, the junction 56 is maintained at a stable reference temperature or its temperature is monitored.

Figure 4A:
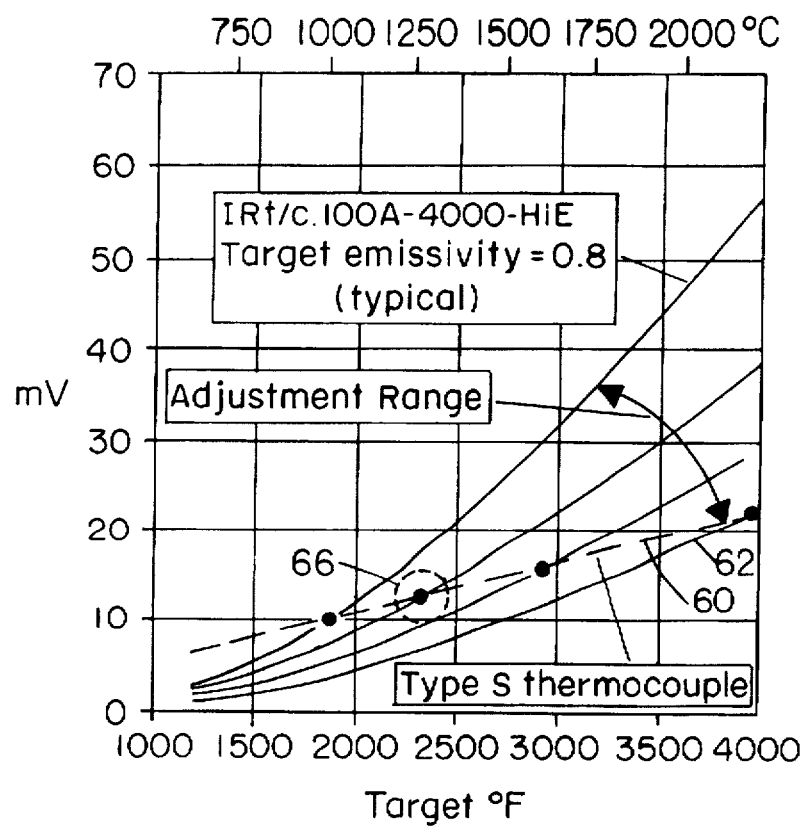
FIG. 4A illustrates the output signal characteristics with calibration of an infrared thermocouple to four target temperatures.

FIGS. 4A and B illustrate the output signal from a typical infrared thermocouple as compared to that of a type S thermocouple. The thermocouple output signal 60 changes linearly with change in target temperature. Each of the nonlinear curves illustrates the output of an infrared thermocouple at a different calibration setting of the potentiometer 36. In each case, the output is a power function of target temperature. By adjusting the potentiometer 36, the output can be raised or lowered to cause the output signal to match the output signal of a thermocouple at a lesser or higher temperature. For example, if in a particular application the infrared thermocouple was to monitor a target temperature at about 4000° F., the potentiometer 36 would be adjusted to bring the output signal to the curve 62 which crosses the thermocouple line at 64 and about 4000° F. The infrared thermocouple would then provide an output signal which approximates the linear output of the thermocouple over a limited range of temperature of about 100° F.

Figure 4B:
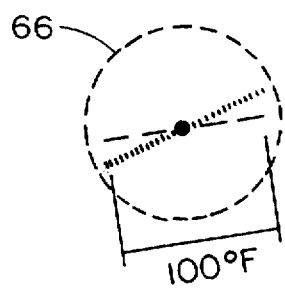
FIG. 4B is an enlarged illustration of the output signal characteristics at one calibrated target temperature.

FIG. 4B is an enlarged view of the portion 66 of FIG. 4A. It can be seen that at the calibration temperature of about 2300° F. the output of the infrared thermocouple directly matches that of a thermocouple at the same temperature. However, at lesser temperatures, the output is lower and at higher temperatures the output is above that of the thermocouple. However, within a linear range of about 100° F., the infrared thermocouple output does not vary from that of a thermocouple by more than ±2%. In some applications, a greater disparity from the conventional thermocouple output can be tolerated for a wider linear range.

One aspect of the invention provides greater output stability with variations in emissivity. Emissivity is the property of a material's surface that describes its "efficiency" at emitting thermal radiation. An emissivity value of 1.0 represents emission at 100%, and 0 describes emission at 0%.

For non-metals and coated metals emissivity is very high, 0.8 and greater, and variations are usually not a problem. For example, for a production process in which a non-metallic material of emissivity of 0.9 is to be controlled, and normal material variations cause emissivity variations of ±0.01, the associated temperature error will be of the order of 0.01 divided by 0.9, or –1% of reading, an acceptable variation. In contrast, if we are to control the temperature of a metal with emissivity 0.2, then variations of ±0.01 will produce an error of the order of (0.01/0.2) or ~5% of reading. Additionally, metal finishes, which play a significant role in emissivity, tend to cause more variations than changes in finish in non-metals.

Figure 5A:
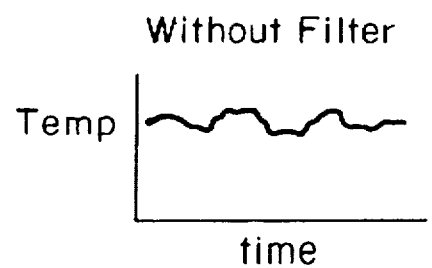
FIG. 5A illustrates the detected temperature with emissivity errors.
Figure 5B:
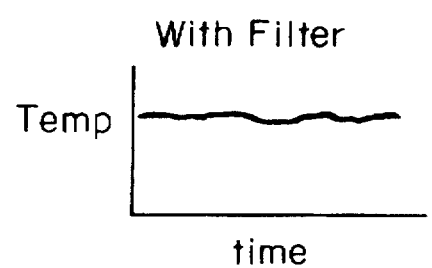
FIG. 5B illustrates the temperature output with those errors minimized using principles of the invention.

FIG. 5A illustrates a temperature reading of the constant temperature target 22 of FIG. 1 as the target is scanned. The lack of readout stability results from the differences in emissivity illustrated in FIG. 1. With the present invention the temperature readout can be stabilized as illustrated in FIG. 5B.

A filter design of the present invention filters out the effects of these emissivity variations on measured temperature by approximately a factor of four and thus reduces the errors by a factor of four. Thus, with the filter, the errors are of the same order as those commonly experienced for high emissivity targets.

Figure 6:
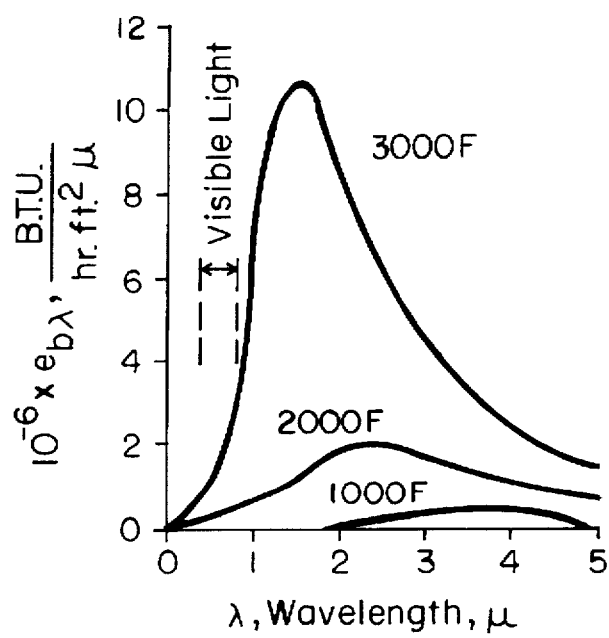
FIG. 6 illustrates the Planck function at various target temperatures.

The method takes advantage of the basic physics of thermal radiation, in which the mathematical description of the energy distribution is by a formula called the Planck function:

$$q_\lambda = \epsilon \frac{2\pi hc^2 \lambda^{-5}}{e^{ch/k\lambda T} - 1}$$

where $q_\lambda$ is radiated energy at a given wavelength, $\epsilon$ is the emissivity, T the absolute target temperature, $\lambda$ the wavelength, and the other symbols are for various physical constants. The Planck function for three temperatures is illustrated in FIG. 6. The Planck function integrates to the more familiar Stefan-Boltzman equation:

$$\text{Radiated Energy} = q = \int_0^\infty q_\lambda d\lambda = \epsilon\sigma T^4$$

when all wavelengths are measured.

Figure 7:
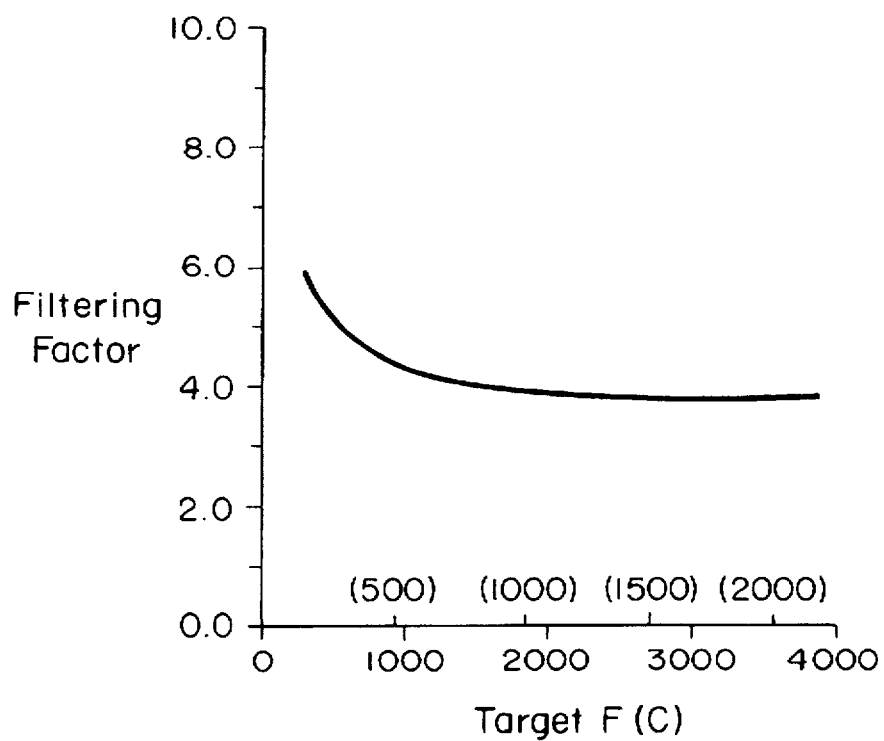
FIG. 7 illustrates the improved performance of an infrared thermocouple modified to minimize emissivity errors in accordance with the invention.

The low emissivity filter works by measuring the energy content of the radiation, as described by the Planck function, over wavelengths that are more selectively sensitive for temperature variations, and therefore proportionately less sensitive to emissivity variations, as follows:

$$\text{Filtered Radiated Energy} = \int_{\lambda_1}^{\lambda_2} d\lambda = \epsilon\sigma T^x$$
where $x >> 4$ If we compute the partial derivative of each expression with respect to emissivity and temperature, we obtain the following relations for the slope of the signal with respect to temperature divided by the slope of the signal with respect to emissivity:

Accordingly, by optimum selection of the wavelengths to be measured, the sensitivity to emissivity variations can be significantly reduced, i.e. filtered, by enhancing the relative sensitivity to temperature. In practice, the best wavelengths are the shorter ones, since they provide the most sensitivity to temperature, and the least sensitivity to emissivity, as is predicted by the integration of the Planck function.

$$\frac{\partial}{\partial \epsilon}(\epsilon\sigma T^4) = \sigma T^4, \frac{\partial}{\partial T}(\epsilon\sigma T^3) \Rightarrow \frac{4\epsilon\sigma T^3}{\sigma T^4} = \frac{4\epsilon}{T}$$

$$\frac{\partial}{\partial \sigma}(\sigma\epsilon T^x) = \sigma T^x \frac{\partial}{\partial T}(\epsilon\sigma T^x) = x\epsilon\sigma T^{(x-1)} \Rightarrow \frac{x\epsilon\sigma T^{(x-1)}}{\sigma T^x} = \frac{x\epsilon}{T}$$
where $x >> 4$ The "filtering factor" for the low emissivity model is based on the selection of 0.1 to 5 micron for the measured wavelengths and results in a factor of from four to six error reduction, depending on target temperature, as illustrated in FIG. 7. In a preferred implementation, the filtering is obtained by a sapphire filter 68 (FIG. 2).

As an additional benefit of the low emissivity filter, errors due to such factors as smoke, dust, moisture, etc. which may partially block the optical path to the target, are also filtered. These factors behave mathematically identically to emissivity, and therefore will be filtered by the same factor of four to six.

Figure 8A:
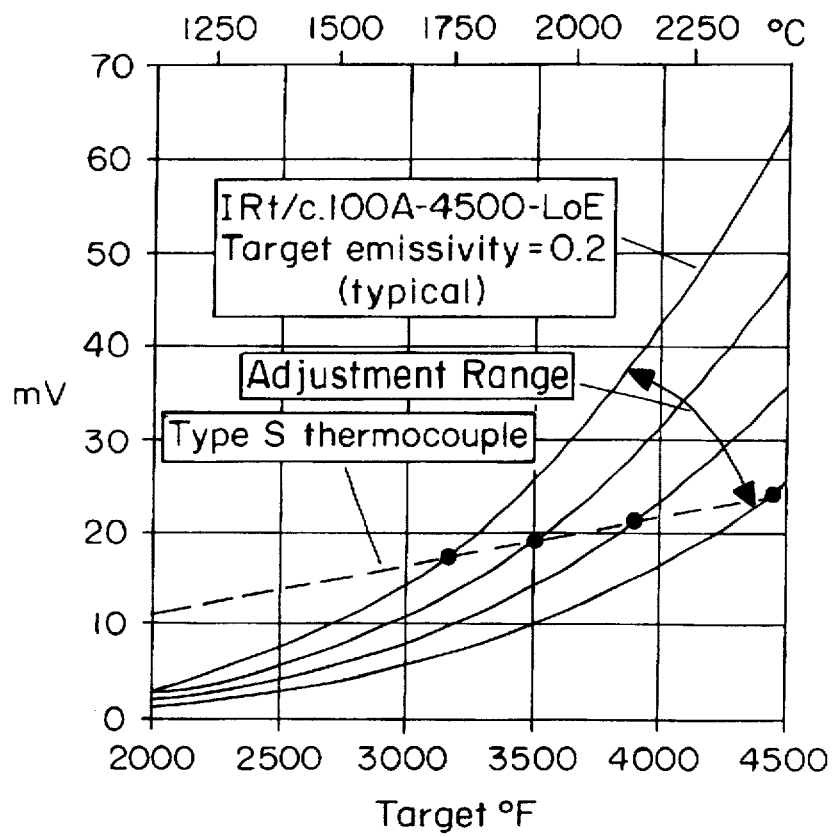
FIG. 8A illustrates the output signal characteristics of an infrared thermocouple modified to reduce emissivity errors.
Figure 8B:
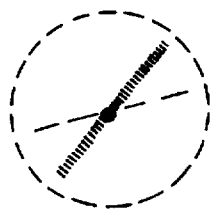
FIG. 8B is an enlarged illustration of the output signal at one calibrated target temperature.

An unfortunate disadvantage of the filtering to low wavelengths is an increased nonlinearity of the output signal as illustrated in FIGS. 8A and 8B compared to FIGS. 4A and 4B. In FIGS. 4A and 4B, the output signal varies to the fourth power of target temperature; whereas, in FIGS. 8A and 8B the output signal varies to the power x which is greater than 4. As a consequence, the output signal at a calibration temperature as illustrated in FIG. 8B changes much more steeply and thus deviates from the linear thermocouple temperature output much more significantly.

Thus, to maintain a difference from the linear output of less than 2%, for example, a much lesser range of temperature variation is permitted.

Figure 9A:
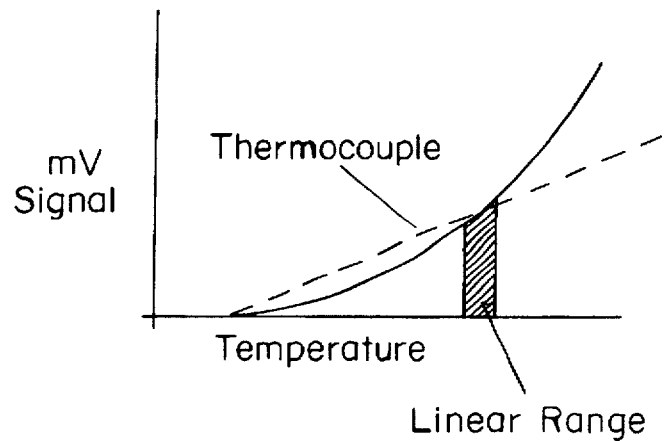
FIGS. 9A, B and C illustrate a calibration method which improves the linear range of an infrared thermocouple.
Figure 9B:
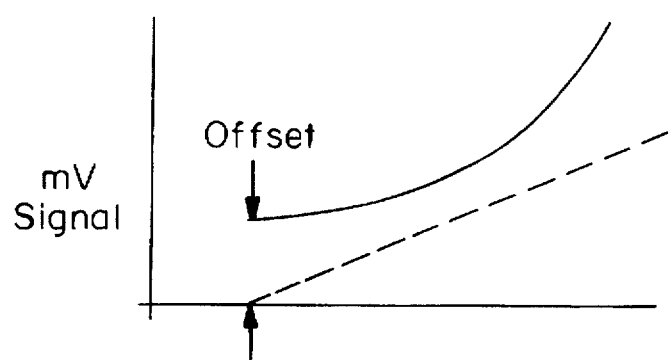
Figure 9C:
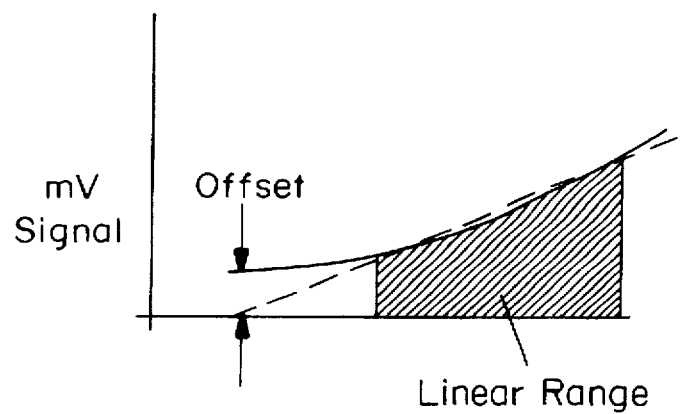

A calibration approach which extends the linear range of the filtered output and which may be used even with the nonfiltered outputs, is illustrated in FIGS. 9A, B and C. A typical narrow linear range for which the output approximates the linear thermocouple output is illustrated in FIG. 9A. This range may be extended by the following calibration technique. Before calibrating the infrared thermocouple with the potentiometer 36, the readout device is provided with an offset which raises the output signal as illustrated in FIG. 9B. As previously illustrated in FIGS. 4A and 8A, calibration with the potentiometer 36 results in a greater change in high temperature response which can be seen as a rotation of the output signal curve. Accordingly, as illustrated in FIG. 9C, calibration of the offset output signal rotates the signal curve to cause it to meet the linear thermocouple output at a desired calibration point. This rotation of the output signal has caused the signal to follow the thermocouple linear output over a substantially wider linear range as illustrated in FIG. 9C. This offset can be obtained using the standard OFFSET, ZERO LO CAL, or equivalent adjustment 88 (FIG. 1) of a conventional readout device.

The optimum offset for extending the linear range has been found to be a percentage of target temperature. For example, for the output of the filtered infrared thermocouple of FIG. 8A, an offset corresponding to 75% of the target temperature is best. For the output of a nonfiltered device (FIG. 4A), an offset of about 60% of target temperature is generally preferred, but at high temperatures of about 3000° F. (1650° C.) an offset of only 50% of target temperature is preferred. In general, an offset of about 40% to 100% provides significant improvements in linear range. For example, a 50° F. linear range can be extended to 300° F.

Consider the example of monitoring steel at 1800° F. (980° C.). Cover the infrared thermocouple with aluminum foil such that it cannot see the target. Then set the readout device offset so that the display reads approximately 75% of target temperature; 0.75×1800=1350° F. (0.75×980=735° C.). Remove the foil, point the infrared thermocouple at the intended target, and adjust the calibration screw 38 (FIG. 2) on the back of the infrared thermocouple until the readout display reads the correct temperature. The calibration is complete, and the linear range over which the reading will be within 2% of actual is approximately 1800° F.±250° F. (1350° C.±140° C.).

Figure 10:
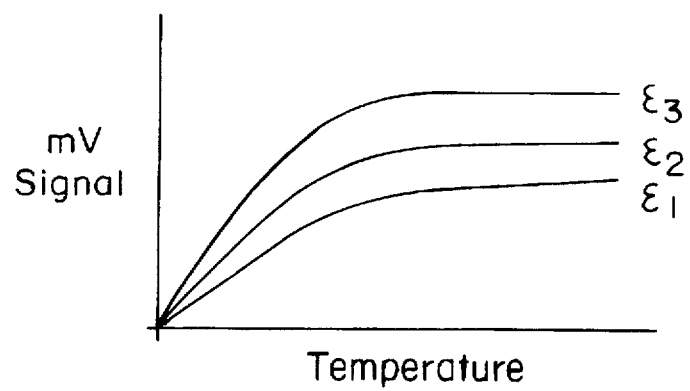
FIG. 10 illustrates the response of output signal to target temperature and emissivity with long wavelength pass filtering.

Though filtering the radiation to pass only short wavelengths increases the stability with changes in emissivity, even greater stability can be obtained by taking two measurements, one at short wavelengths and another at longer wavelengths. Prior infrared thermocouples have used silicon optics to pass wavelengths of 7 microns to 20 microns. Such filters have been used to linearized the output by removing the very nonlinear response found at the shorter wavelengths. FIG. 10 illustrates the response of the signal output in the long wavelength range and can be compared to the short wavelength output of FIG. 8A. It can be seen that, at lower temperatures, the output is a near linear function of temperature, while at higher temperatures, the output levels off to a near constant value dependent principally on change in emissivity. Accordingly, the long wavelength signal can be seen to be a linear function of temperature or $$s_{lw} = c_1 \epsilon f_1(T)$$

Thus the long wavelength signals can be seen to be strongly dependent on emissivity. The short wavelength signal, on the other hand, is strongly dependent on temperature:

$$s_{rw}=c_2\epsilon f_2(T^n)$$

Alternatively, the second measurement could be of wide band without filtering and thus be a power of four. By taking the two measurements, the emissivity can be removed as a variable in determining temperature.

Figure 11A:
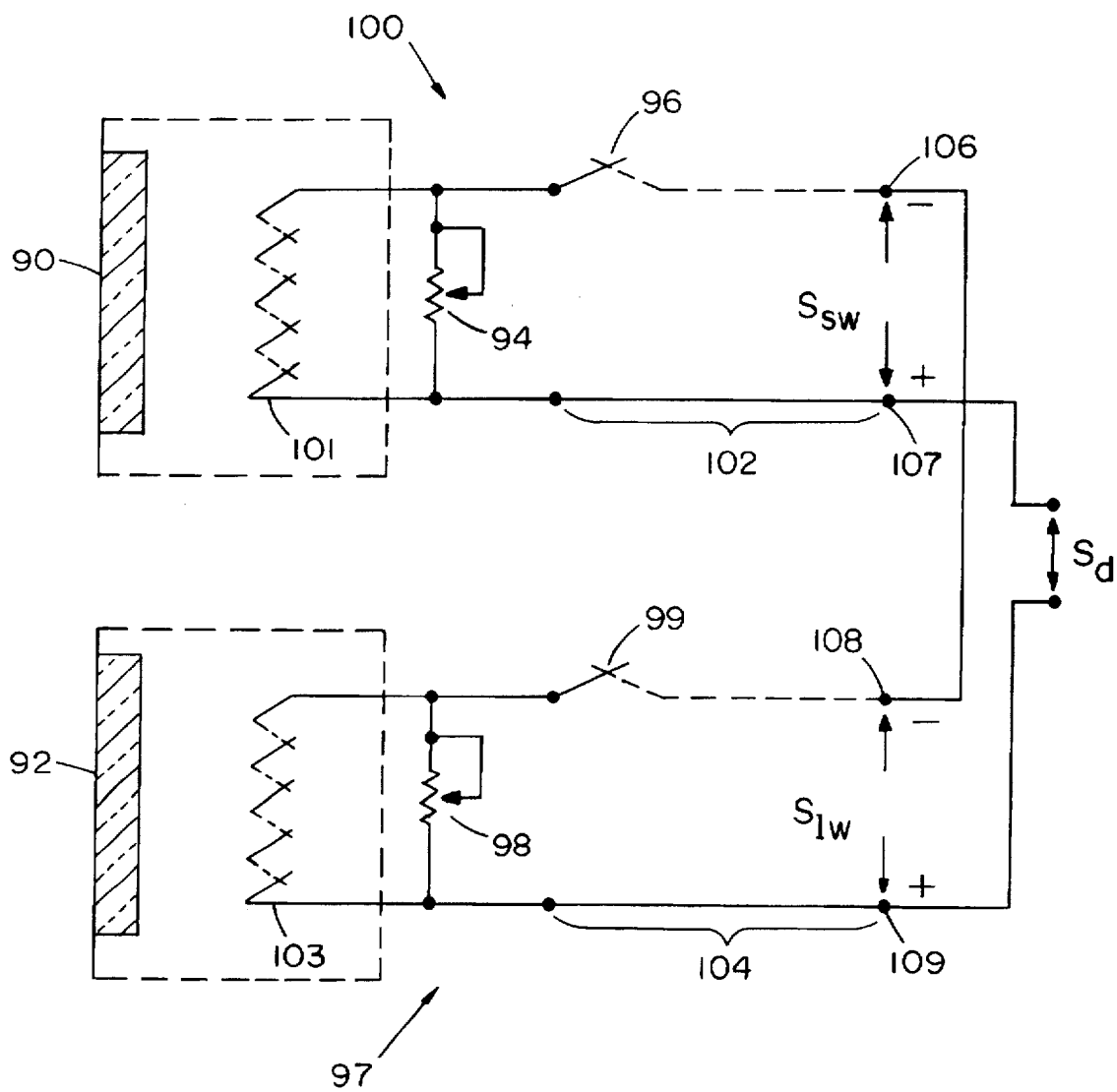
FIG. 11A schematically illustrates differential coupling of two infrared thermocouples.

At very high temperatures, where the long wavelength signal is much less dependent on temperature than it is on emissivity, a differential measurement of the two signals can be taken. A differential reading can be taken from the circuit of FIG. 11A. This circuit can be seen to be identical to that of FIG. 4 of U.S. Pat. No. 5,319,202 except that the windows 90 and 92 are filters of short and long wavelength bands respectively. Specifically, a short wavelength band of 0.1 to 5 microns and a long wavelength band of 6.5 to 14 microns are preferred. Thus, there is provided a first detector 100 having a thermopile 101 and a calibration potentiometer 94 coupled in series with a thermocouple 102 having junctions 96 and 106, 107. The second infrared thermocouple detector 97 comprises a thermopile 103 having a calibration potentiometer 98. A thermocouple 104 comprises a junction 99 and a junction 108, 109. When coupled together in series, the combined output $s_d$ is the difference between $s_{rw}$ and $s_{lw}$. Since both $s_{rw}$ and $s_{lw}$ vary linearly with emissivity, any changes in $s_d$ would be independent of change in emissivity. Changes in the output would thus be dependent on temperature only. The differential readout is insensitive not only to emissivity changes in the target, but to any condition which affects both detector outputs equally. For example, smoke and common obstructions will not change the differential output.

Although the use of a thermocouple in series with the thermopile is generally preferred it is not always required. In particular, the thermocouple output becomes less significant as target temperature increases.

Figure 11B:
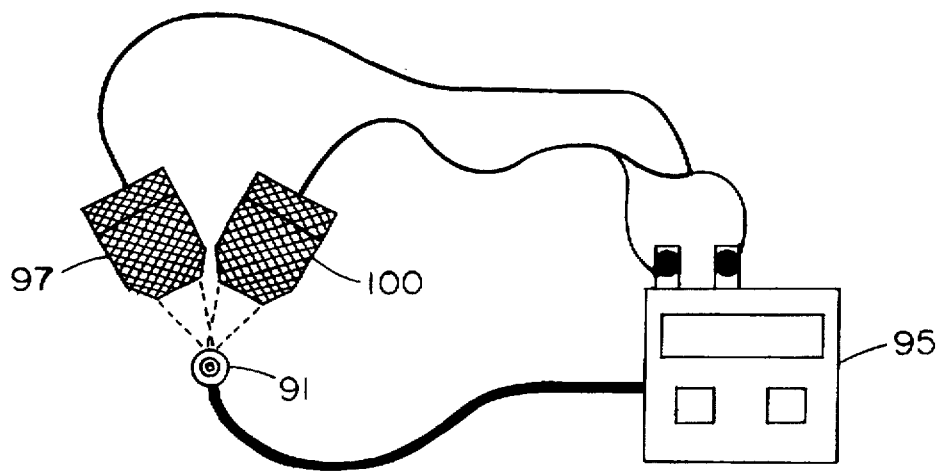
FIG. 11B illustrates a physical implementation of the differentially coupled infrared thermocouples.
Figure 11C:
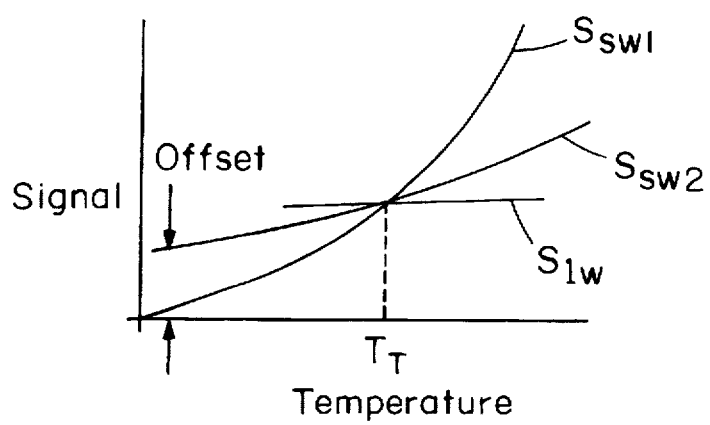
Figure 11C illustrates calibration of the differentially coupled infrared thermocouples.

A physical implementation of the differential measurement is illustrated in FIG. 11B. The short wavelength detector 100 and long wavelength detector 97 are mounted such that they both view the same target area. They are connected in series opposition to the thermocouple inputs of a monitor or controller 95. The controller drives a heater at the target 91.

One method of calibrating the differential system is illustrated in FIG. 11B. First calibrate the short wave infrared thermocouple to the target temperature with the long wave infrared thermocouple covered with foil. Accordingly, if the target temperature were 2000° F., the offset of the readout device would be set to 75% of that temperature or 1500° F. Then, while viewing the target at that temperature, the short wave potentiometer 94 is adjusted to bring the output to 2000° F. The short wave response is thus rotated form $S_{rw1}$ to $S_{rw2}$. Then the long wave infrared thermocouple is exposed to the target. The potentiometer 98 would be adjusted to bring the output reading to 1500° F., the meter reading with a zero signal, thus assuring that $s_{rw2}=s_{lw}$. Finally, the offset of the readout device is adjusted to bring the readout to the target temperature of 2000° F.

The above calibration method is particularly suited to systems which require an accurate temperature indication over some range of temperatures. In a controller implementation where the sensed signal is used to control the temperature and thus maintain a particular operating temperature, a simpler calibration technique may be used. With the target surface heated to the operating temperature, the outputs of the individual detectors are determined using a digital voltmeter. By means of the scaling potentiometer 94 or 98, the detector having the highest output is adjusted to cause that detector output to equal the output of the other. The two detectors are then connected in series opposition such that the combined signal to the controller 95 is zero. The detectors are wired such that the short wavelength unit increases temperature displayed with an increase in signal and the high wavelength unit decreases temperature display with increase in signal. The controller offset is then adjusted so that the differential signal causes a reading of the actual target temperature on the controller. In this calibration technique, no attempt is made to flatten the response of either detector since, with any drift in either direction, the controller brings the temperature back to the predefined operating temperature to maintain a constant reading at the operating temperature.

Although a variable resistor has been illustrated as the means for calibrating the detectors, it will be recognized that a variable aperture can serve the same function. The variable resistor is preferred since a tuned aperture is more difficult and costly to implement. Further, in some applications a detector can be calibrated by appropriate selection of a fixed resistor.

Figure 12B:
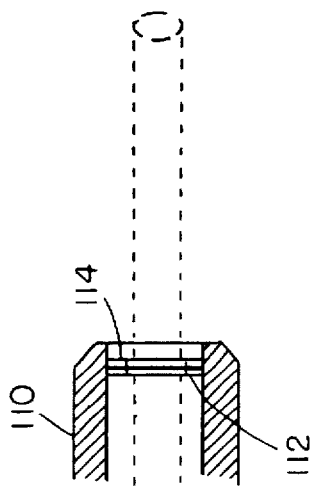
FIG. 12B is a cross-sectional view of the infrared thermocouple with installed aperture.
Figure 12A:
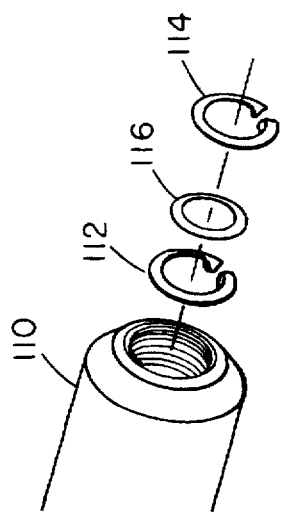
FIG. 12A is an exploded view of a removable aperture assembly to be coupled to an infrared thermocouple.

FIGS. 12A, B and C illustrate the use of an aperture kit for rough detector calibration to extend the available target temperature range for a given infrared thermocouple, improve the adjustment sensitivity of the adjustment potentiometer and to reduce the minimum spot size. In a preferred example, an aperture kit comprises two apertures of one half inch (13 mm) and one quarter inch (6 mm) of stainless steel and two retaining rings. As illustrated in FIG. 12A, the internal surface of the housing 110 of the infrared thermocouple is threaded. The thread provides a groove in which retaining clips 112 and 114 may be seated to retain an aperture 116 therebetween as illustrated in FIG. 12B. The aperture reduces the quantity of radiated energy entering the infrared thermocouple optical system, thus increasing the rated maximum target temperature before burnout. In addition, since less signal is produced at a given temperature, the adjustment will be less "tweaky" when calibrating the installation.

Figure 12C:
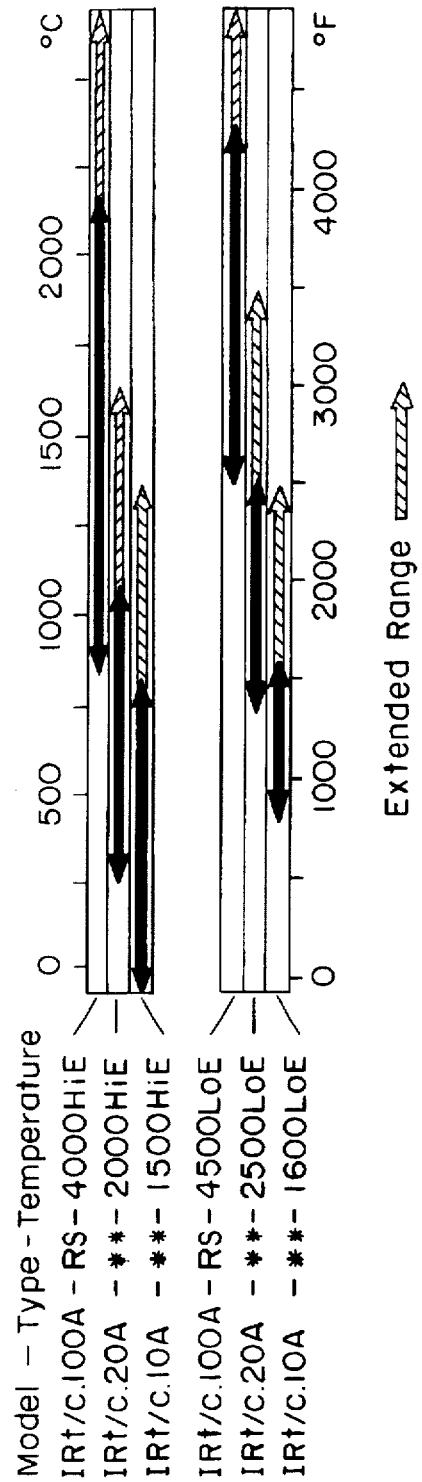
FIG. 12C illustrates the potential extended ranges obtainable using the aperture of FIGS. 12A and 12B.

An example illustration of how the apertures can extend the range of several infrared thermocouple models is presented in FIG. 12C. The values 100, 20, and 10 indicate the normal field of view of the detector, that is the ratio of distance from the detector to spot size. Those fields of view are determined by the lens optics of the detectors. The cross-hatched regions indicate the extended temperatures over which each of the detectors may be viewed.

Measurement of very thin targets, such as extrusions as illustrated in FIG. 13A, can be very difficult. In order to avoid detection of background surface area, the field of view of the infrared thermocouple 120 should be no greater than the width of the extrusion 122. To avoid the extreme loss in sensitivity with such a small field of view, the infrared thermocouple 120 includes two modifications: a focusing lens which enables the user to image the thermopile flake onto the narrow extrusion and a thermopile flake which is itself elongated so that it can be aligned with the extrusion to sense an extended length of the extrusion without sensing beyond the width of the extrusion. Accordingly, FIG. 13D illustrates an image of the thermopile flake 124. As illustrated in FIG. 13C, the focusing lens 126 enables the filament 122 to be focused directly onto the flake. As an alternative to actually shaping the thermopile flake to control the sensing region, additional optics may be included to image both the flake and the target onto an elongated aperture.

As illustrated in FIG. 13B, the rear surface of the infrared thermocouple is scribed with lines 123 which assist in alignment of the flake parallel to the target. Alignment of the infrared thermocouple with the extrusion 122 can be fine tuned by moving the sensor closer, farther and rotated slightly until a maximum signal is obtained.

An alternative use of the infrared thermocouple 120 having a focusing lens and elongated flake is illustrated in FIG. 14. In this case, a large target is positioned behind a narrow slot. To view the target, the flake is imaged onto the opening to view a larger field 130 of the target 132.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of detecting temperature of a target by an infrared detector with reduced emissivity sensitivity comprising:

providing first and second infrared detectors, a first pass band filter for passing a first wavelength range of radiation to the first infrared detector and a second pass band filter for passing a second wavelength radiation to the second infrared detector the second range including longer wavelengths than the first range;

sensing radiation from a target through the first filter and first radiation detector to provide a first emissivity dependent output;

sensing radiation from the target through the second filter and the second infrared detector to provide a second emissivity dependent output; and electrically coupling the first and second emissivity dependent outputs to subtract one from the other and provide a temperature signal which is substantially less dependent on emissivity than are the first and second emissivity dependent outputs.

2. A method as claimed in claim 1 wherein each of the first and second infrared detectors is an infrared thermocouple.

3. A method as claimed in claim 1 further comprising calibrating the first and second infrared detectors by:

coupling the temperature signal to a readout device:

providing an offset to the readout device to cause an offset readout with no radiation input to the infrared detectors;

causing the first infrared detector to view a target at a calibration temperature;

calibrating the first infrared detector to cause the readout to correspond to the calibration temperature;

causing the second infrared detector to view the target at the calibration temperature;

calibrating the second infrared detector to cause the readout to correspond to the offset readout; and changing the offset to the readout device to cause the readout to correspond to the calibration temperature.

4. A method as claimed in claim 1 further comprising calibrating the first and second infrared detectors by:

coupling the temperature signal to a readout device:

calibrating at least one of the infrared detectors to provide equal outputs from the detectors while viewing a common target at a calibration temperature; and changing an offset to the readout device to cause a readout of the temperature signal to correspond to the calibration temperature of the target.

5. A method as claimed in claim 1 wherein the first passband filter blocks wavelengths greater than about 5 microns.

6. A method as claimed in claim 5 wherein the second passband filter has a passband of about 6.5 microns to 14 microns.

7. A method as claimed in claim 1 wherein each infrared detector comprises a sensor which generates voltage in response to infrared radiation in a passive circuit.

8. A method of detecting temperature of a target by an infrared detector with reduced emissivity sensitivity comprising:

sensing radiation from a target in a first wavelength passband by a first radiation detector to provide a first emissivity dependent output;

sensing radiation from the target in a second wavelength passband by a second infrared detector to provide a second emissivity dependent output, the second wavelength passband being different than the first wavelength passband; and electrically coupling the first and second emissivity dependent outputs to subtract one from the other and provide a temperature signal which is substantially less dependent on emissivity than are the first and second emissivity dependent outputs.

9. A method as claimed in claim 8 wherein each infrared detector comprises a sensor which generates voltage in response to infrared radiation in a passive circuit.

10. A method as claimed in claim 8 wherein each of the first and second infrared detectors is an infrared thermocouple.

11. A method as claimed in claim 8 further comprising calibrating the first and second infrared detectors by:

coupling the temperature signal to a readout device;

providing an offset to the readout device to cause an offset readout with no radiation input to the infrared detectors;

causing the first infrared detector to view a target at a calibration temperature;

calibrating the first infrared detector to cause the readout to correspond to the calibration temperature;

causing the second infrared detector to view the target at the calibration temperature;

calibrating the second infrared detector to cause the readout to correspond to the offset readout; and changing the offset to the readout device to cause the readout to correspond to the calibration temperature.

12. A method as claimed in claim 8 further comprising calibrating the first and second infrared detectors by:

coupling the temperature signal to a readout device;

calibrating at least one of the infrared detectors to provide equal outputs from the detectors while viewing a common target at a calibration temperature; and changing an offset to the readout device to cause a readout of the temperature signal to correspond to the calibration temperature of the target.

* * * * *